(12) United States Patent
Price

(10) Patent No.: US 11,544,092 B2
(45) Date of Patent: Jan. 3, 2023

(54) MODEL SPECIFIC REGISTER (MSR) INSTRUMENTATION

(71) Applicant: Raytheon Company, Waltham, MA (US)

(72) Inventor: Gregory Price, Silver Spring, MD (US)

(73) Assignee: Raytheon Company, Waltham, MA (US)

( * ) Notice: Subject to any disclaimer, the term of this patent is extended or adjusted under 35 U.S.C. 154(b) by 249 days.

(21) Appl. No.: 16/541,623

(22) Filed: Aug. 15, 2019

(65) Prior Publication Data

US 2021/0049028 A1 Feb. 18, 2021

(51) Int. Cl.
G06F 9/455 (2018.01)

(52) U.S. Cl.
CPC ...... *G06F 9/45558* (2013.01); *G06F 9/45541* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 7,162,715 B1 | 1/2007 | Whittaker et al. | |
| 8,863,279 B2 | 10/2014 | McDougal et al. | |
| 9,009,820 B1 | 4/2015 | McDougal et al. | |
| 9,208,307 B2 | 12/2015 | Salsamendi | |
| 9,311,248 B2 | 4/2016 | Wagner | |
| 10,264,028 B2 | 4/2019 | Wysocki et al. | |
| 11,010,280 B1* | 5/2021 | Stupachenko | G06F 11/3624 |
| 2006/0130016 A1 | 6/2006 | Wagner | |
| 2014/0068601 A1 | 3/2014 | Simms et al. | |
| 2018/0067866 A1* | 3/2018 | Shanbhogue | G06F 11/0712 |
| 2018/0287902 A1* | 10/2018 | Chitalia | H04L 43/045 |
| 2018/0357093 A1* | 12/2018 | Cong | G06F 21/6281 |
| 2019/0205238 A1* | 7/2019 | Lemay | G06F 11/3466 |

OTHER PUBLICATIONS

Blagodurov et al. (User-level scheduling on NUMA multicore systems under Linux, 2011, Linux symposium. vol. 2011. p. 81-92) (Year: 2011).*

* cited by examiner

*Primary Examiner* — Lewis A Bullock, Jr.
*Assistant Examiner* — Melissa A Headly
(74) *Attorney, Agent, or Firm* — Daly, Crowley, Mofford & Durkee, LLP

(57) ABSTRACT

Techniques are disclosed for dynamic access and instrumentation of model specific registers (MSRs). A virtual machine monitor (VMM) can provide a kernel application program interface (API) that can be utilized to access and instrument an MSR. A method may include receiving, by the VMM, an MSR instrumentation command that identifies an MSR to instrument and causing instrumentation of the MSR identified in the MSR instrumentation command. Instrumentation of the identified MSR can be caused by configuring or manipulating a virtual machine control structure (VMCS) of a guest virtual machine (VM). The MSR instrumentation command may be an MSR instrumentation request command, an MSR remove request command, an MSR value set request command, or an MSR value fetch request command. In some cases, the VMM may be a Type-I hypervisor.

18 Claims, 7 Drawing Sheets

MODEL SPECIFIC REGISTER (MSR) INSTRUMENTATION

BACKGROUND

Hardware virtualization is the abstraction of computing resources from the software that uses them. Virtualization is performed on a given hardware platform by a host control program (i.e., a virtual machine monitor (VMM) or so-called hypervisor), which creates an abstraction layer between the underlying hardware and the software. Once a hypervisor is in place, it provides a simulated computing environment, commonly known as a virtual machine (VM), for its guest software. In typical applications, multiple VMs execute simultaneously on the same physical machine, sharing the hardware resources among them, thus reducing investment and operating costs. However, each VM run its own operating system and software applications and, thus, is logically separated from every other VM.

Virtual machine introspection provides capabilities to monitor the run-time state of a VM. For example, introspection may be used to observe the execution of a VM's operating system. Introspection involves obtaining information regarding the state of a VM executing on a computer, such as memory usage and processor state, without accessing the VM itself. Thus, introspection is useful for a variety of applications, including malware detection and analysis, software debugging, and forensic memory analysis, to name a few examples.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with the concepts, systems, and techniques described herein, in some embodiments, a computer-implemented method to dynamically instrument a model specific register (MSR) includes: receiving, by a virtual machine monitor (VMM), an MSR instrumentation command, the MSR instrumentation command identifying an MSR to instrument; and causing, by the VMM, instrumentation of the MSR identified in the MSR instrumentation command by configuring or manipulating a virtual machine control structure (VMCS) of a guest virtual machine (VM).

In one aspect, the MSR instrumentation command is received through a kernel application program interface (API) of the VMM.

In one aspect, the MSR instrumentation command includes an MSR instrumentation request command that requests instrumentation of the identified MSR, and the VMCS is configured to cause a VM exit of the guest VM upon access of the identified MSR.

In one aspect, the MSR instrumentation command includes an MSR remove request command to stop instrumentation of the identified MSR, and the VMCS is configured to not cause a VM exit of the guest VM upon access of the identified MSR.

In one aspect, the MSR instrumentation command includes an MSR value set request command that requests that a specified value be input into the identified MSR, and the VMCS is configured to cause the specified value to be input into the identified MSR. In some cases, the specified value may be input into the identified MSR upon a VM entry of the guest VM.

In one aspect, the MSR instrumentation command includes an MSR value fetch request command that requests that a current value of the identified MSR to be read and returned, and the VMCS is configured to cause the current value of the identified MSR to be read. In some cases, the current value of the identified MSR is read upon a VM exit of the guest VM.

In some embodiments, a system to dynamically instrument a model specific register (MSR) includes one or more non-transitory machine-readable mediums configured to store instructions, and one or more processors configured to execute the instructions stored on the one or more non-transitory machine-readable mediums. Execution of the instructions causes the one or more processors to: generate a virtual machine monitor (VMM) that is configured to receive an MSR instrumentation command, the MSR instrumentation command identifying an MSR to instrument; and cause instrumentation of the MSR identified in the MSR instrumentation command by configuring or manipulating a virtual machine control structure (VMCS) of a guest virtual machine (VM).

In one aspect, the VMM is a Type-I hypervisor.

In one aspect, the VMM is further configured to provide a kernel application program interface (API), and the MSR instrumentation command is received through the kernel API.

In one aspect, the MSR instrumentation command is issued by an application external to the VMM.

In some embodiments, a computer program product includes one or more non-transitory machine-readable mediums encoding instructions that when executed by one or more processors cause a process to be carried out to dynamically instrument a model specific register (MSR). The process includes, by a virtual machine monitor (VMM): receiving an MSR instrumentation command, the MSR instrumentation command identifying an MSR to instrument; and causing instrumentation of the MSR identified in the MSR instrumentation command by configuring or manipulating a virtual machine control structure (VMCS) of a guest virtual machine (VM).

In one aspect, the MSR instrumentation command includes one of an MSR instrumentation request command that requests instrumentation of the identified MSR, an MSR remove request command to stop instrumentation of the identified MSR, an MSR value set request command that requests that a specified value be input into the identified MSR, and an MSR value fetch request command that requests that a current value of the identified MSR to be read and returned.

Figure 1:
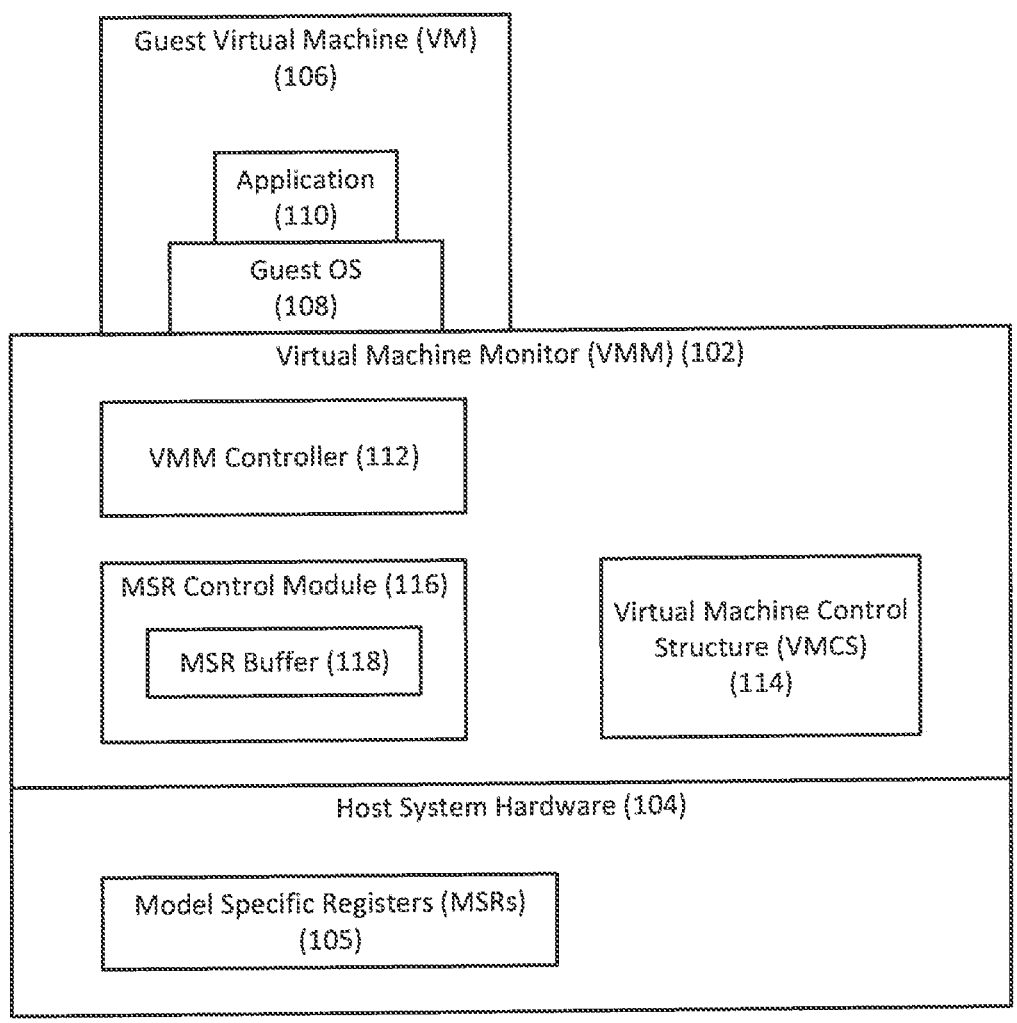
FIG. 1 is a block diagram illustrating selective components of an example computing system including a virtual machine monitor (VMM) providing an introspection module, in accordance with an embodiment of the present disclosure.

These and other features of the present embodiments will be understood better by reading the following detailed description, taken together with the figures herein described.

DETAILED DESCRIPTION

As noted above, virtual machine introspection (VMI) provides a capability to monitor the run-time state of a VM. In some cases, VMI tools may be implemented within a VMM that capture information from the VMM, which can be used to analyze processes executing in the system. To this end, some VMMs provide the ability to instrument model specific registers (MSRs) to recover kernel-level information related to the system calls executed on a guest VM. In these VMMs, MSR instrumentation capability may be implemented by hardcoding the VMM to cause a VM Exit on any MSR access from userland, for example, by a userland application. For example, a userland application can execute code that attempts to read/write a value of an MSR by executing an RDMSR (read from MSR) instruction, a WRMSR (write to MSR) instruction, or other explicit guest code that attempts to read the value of an MSR. This results in the VMM exiting the guest system (i.e., guest VM) on access of any MSR, regardless of whether a particular MSR is being used for introspection. This may result in a significant impact on performance. Furthermore, when a new MSR is provided, the VMM needs to be manually hardcoded (e.g., ported) to support instrumentation of the new MSR before the new MSR can be utilized.

In accordance with an embodiment of the present disclosure, techniques are disclosed that allow for dynamic access and instrumentation of MSRs. The techniques may further provide support for access and instrumentation of an MSR before a VMM is ported to support the MSR. Instrumentation may refer to technology for monitoring or measuring the level of performance, diagnosing errors (including debugging and replay), and writing trace information. For example, in the context of computer programming, a programmer may implement instrumentation in the form of code instructions that monitor specific components of a system. To this end, instrumentation of MSRs may refer to using MSRs to analyze the performance (e.g., monitor or measure the level of performance, diagnose errors, trace, etc.) of a system.

In some embodiments, the dynamic access and instrumentation of the MSRs are achieved by providing a kernel application program interface (API) that abstracts access to MSRs of the host system. In one example implementation, the kernel API is provided by a VMM. Using the provided kernel API, an external application, such as a userland application, is able to dynamically specify what MSRs are to be saved and loaded upon VM transitions (e.g., entry and/or exit from a guest VM). In other words, the kernel API allows for dynamically choosing what MSRs should be preserved upon entering and exiting a guest VM. Dynamically choosing what MSRs are to be saved and loaded upon VM transitions provides for dynamically controlling what MSR accesses cause VM exits (and, conversely, what MSR accesses do not cause VM exits). Thus, the disclosed techniques provide capabilities for introspecting a guest VM by instrumenting a specific MSR or MSRs. This enables the vast majority of the system to execute unimpeded by the additional instrumentation, while only incurring performance overhead for accesses to the MSRs being instrumented (and no performance overhead for accesses to the MSRs that are not being instrumented).

In more detail, and in accordance with an embodiment of the present disclosure, a VMM is programmed with or otherwise includes an MSR control module that is configured to provide a kernel API through which an external application can dynamically specify host system MSRs for saving and/or restoration between guest VM transitions. In such embodiments, the kernel API may include and provide a user-facing (userland-facing) portion or component that is accessible by a userland application to interact with or otherwise utilize the MSR control module. The user-facing component can "mirror" the functionality provided by the kernel API, thus allowing a userland application to interact with and utilize the functionality provided by the kernel API as disclosed herein.

In one example implementation, the kernel API allows for instrumenting an MSR by specifying an MSR-value pair with a corresponding MSR instrumentation command. Depending on the type of command (e.g., an MSR instrumentation request, an MSR remove request, an MSR value set request, and an MSR value fetch request), the MSR control module interacts with a virtual machine control structure (VMCS) of a guest VM that is being introspected to cause performance of the requested command. For example, in the case of an MSR instrumentation request command, the MSR control module can configure or otherwise manipulate the VMCS (e.g., a bitmap that controls VM exits for MSRs) to cause a VM exit upon access of an MSR specified with the MSR instrumentation request command. In the case of an MSR remove request command, the MSR control module can configure or otherwise manipulate the VMCS to not cause a VM exit upon access of an MSR specified with the MSR remove request command. In the case of an MSR value set request command, the MSR control module can configure or otherwise manipulate the VMCS to cause a value specified with the MSR value set request command to be input into an MSR specified with the command, for example, in an MSR-value pair. For example, in one implementation, the specified value can be input or read into the MSR upon a VM entry. In the case of an MSR value fetch request command, the MSR control module can configure or otherwise manipulate the VMCS to cause a current value of an MSR specified with the MSR value fetch request command to be read from the MSR and returned. For example, in one implementation, the current value of the MSR can be read upon a VM exit.

The disclosed techniques provide numerous advantages over previous techniques for instrumenting MSRs. For example, and according to an embodiment, the various techniques disclosed herein provide the ability to dynamically modify which MSRs cause VM exits subsequent to creation of the VM. This provides performance gains from the potential of fewer VM exits as compared to previous techniques which would enable, disable, or otherwise configure what MSRs cause VM exits at the time of VM creation without providing users the ability to dynamically change the configuration post creation of the VM. In addition, in some embodiments, the dynamic control of MSRs provided by the disclosed techniques provide forward compatibility for leveraging new MSRs provided by chipset manufactures in the future (e.g., new MSR supported in later models of a given processor architecture). For example, Last Branch Record (LBR) MSRs, which track branches taken by a system, may have been provided by the chipset manufacturer subsequent to creation of the VMM. That is, the VMM may not have been ported to support the LBR MSRs. However, the ability to dynamically specify MSRs for instrumentation provided by the disclosed techniques allows for instrumenting the LBR MSRs utilizing the VMM created prior to support of the LBR MSRs. Thus, unlike conventional MSR instrumentation techniques that required configuring VM exits at the time of VM creation, a system configured in accordance with an embodiment of the present disclosure allows instrumenting an MSR whether or not a VMM is itself configured to support instrumentation of the MSR at the time of creation. These and other advantages and alternative embodiments will be apparent in light of this disclosure.

Turning now to the figures, FIG. 1 is a block diagram illustrating selective components of an example computing system 100 including a virtual machine monitor (VMM or so-called hypervisor) 102 providing an introspection module, in accordance with an embodiment of the present disclosure. More specifically, computing system 100 illustrated in FIG. 1 can be understood as enabling dynamic instrumentation of one or more MSRs by, for example, providing users the ability to dynamically specify what MSRs are to be saved and loaded upon VM transitions. As can be seen, VMM 102 can be a Type-I hypervisor (i.e., bare-metal hypervisor) that is configured to execute directly on the hardware of a host system, such as, for example, a host system hardware 104.

Host system hardware 104 may include one or more processors, memory (e.g., random access memory (RAM), read only memory (ROM), or other suitable computer-readable storage mediums), and a network interface card (NIC), to provide a few examples. In addition, as shown in FIG. 1, host system hardware 104 includes one or more MSRs 105. MSRs 105 include general purpose registers that are specific to a model of a processor, such as the x86 processor provided by Intel Corporation® of Santa Clara, Calif. MSRs 105 may be used for debugging, program execution tracing, performance monitoring, and/or controlling features of the processor implementing or otherwise supporting MSRs 105, for example, by modifying the values of one or more MSRs 105. Although certain embodiments and/or examples are described herein in the context of a Type-I hypervisor, it will be appreciated in light of this disclosure that such embodiments and/or examples are not restricted as such, but are applicable to hypervisors in the general sense, including Type-II hypervisors configured to execute on top of an operating system of a host system.

In brief, VMM 102 is similar to a kernel process for standard operating systems, including hardware support. VMM 102 is configured to present a virtual hardware interface to VM environments, handle scheduling of system resources between VM environments, and allocate required resources as needed by each VM environment. In the Type-I implementation, VMM 102 provides software emulation of host system hardware 104.

VMM 102 can be configured to provision a guest virtual machine (VM) 106. Guest VM 106 can execute a guest operating system (OS) 108 and an application 110. Guest OS 108 may include any suitable operating system, such as Microsoft Windows®, Linux®, MacOS®, iOS®, or Android™, to provide a few examples. Guest OS 108 may provide an interface between applications, such as application 110, executing within guest VM 106 and the hardware devices being virtualized by guest VM 106. Application 110 may include any suitable software application, such as a an application or system debugging application, an image viewing application, an audio application, a video application, a browsing application (e.g., Internet browser), an electronic communications application (e.g., e-mail application), social media application, a word processing application, a graphics application, or any other suitable application. Although FIG. 1 shows only a single guest VM provisioned by the VMM, it will be appreciated that the VMM can provision any number of guest VMs. Further, although the guest VM is shown to include a single application, it will be appreciated that multiple applications can be included within a guest VM.

Referring still to FIG. 1, VMM 102 includes a VMM controller 112, a virtual machine control structure (VMCS) 114, and an MSR control module 116, which further includes an MSR buffer 118. VMM controller 112 is generally configured to facilitate interaction with VMM 102. For example, in one implementation, VMM controller 112 arbitrates messages, such as commands, received by VMM 102 and dispatch the messages to the appropriate components of VMM 102 for processing. The messages may be from within VMM 102, such as from a component of VMM 102, or from outside of VMM 102, such as from a guest VM or an application executing within a guest VM. For example, a debugger application executing in userland may be programmed to make or issue an MSR instrumentation command to VMM 102. In this example case, VMM controller 112 can receive the MSR instrumentation command and dispatch the MSR instrumentation command to an appropriate component of VMM 102, such as introspection module 116, for processing. MSR instrumentation and introspection module 102 are further described below.

In brief, VMCS 114 (sometimes referred to as a virtual machine control block or VMCB depending on the type of processor platform) includes a data structure used by VMM 102 to manage operation of a guest VM, such as guest VM 106. VMCS 114 is also used to control which Guest VM operations will cause VM exits. To this end, in one example embodiment, VMCS 114 may be implemented as a structure that includes a guest state area (GSA), a host state area (HSA), and control information (e.g., execution control information, exits control information, entries control information, etc.) that indicates how VMM 102 is to control operation of a guest VM, information regarding VM exits, information regarding VM entries, and any other such information. For example, in the context of guest VM 106, at VM entry into guest VM 106, VMM 102 saves the host processor state information (e.g., the state of the processor of host system hardware 104 being virtualized by VMM 102) in the HSA of VMCS 114 associated with guest VM 106, and uses information in the GSA of VMCS 114 associated with guest VM 106 to restore the state of the virtual processor of guest VM 106. At VM exit from guest VM 106 to VMM 102, VMM 102 uses information in the HSA of VMCS 114 associated with guest VM 106 to restore the host processor state.

MSR control module 116 is generally configured to facilitate introspection of a guest VM, such as guest VM 106, by allowing dynamic access and instrumentation of MSRs. In one example implementation, MSR control module 116 can provide a kernel API through which an external application can dynamically specify host system MSRs for saving and/or restoring between guest VM transitions. For example, using such kernel API, an external application can make or issue an MSR instrumentation command to MSR control module 116 to instrument and/or operate on an MSR. In response to the MSR instrumentation command, MSR control module 116 can configure VMCS 114 of the external application in a manner as to cause performance of the MSR instrumentation command. MSR control module 116 is further described below with respect to FIGS. 2-6.

Figure 2:
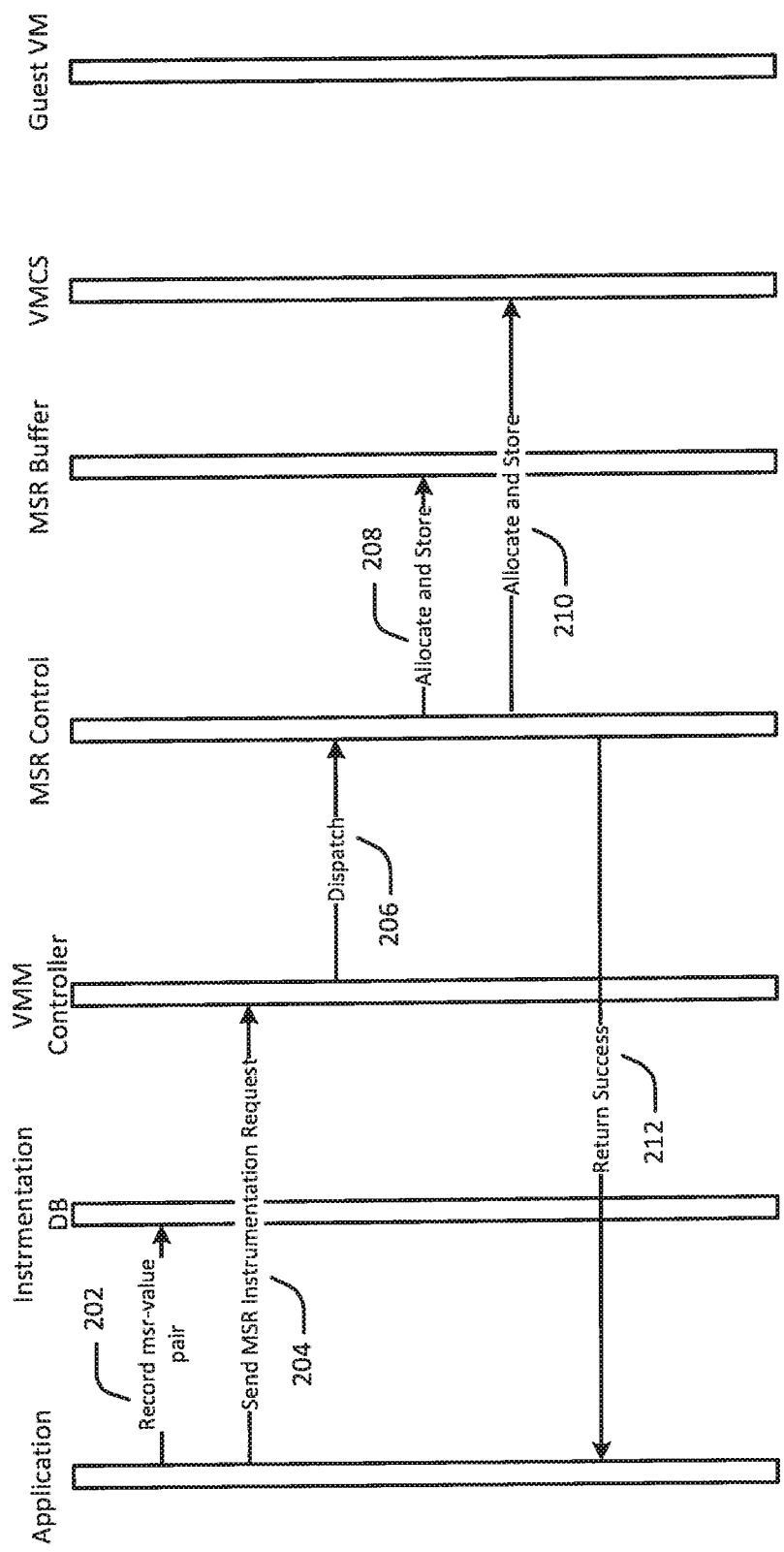
FIG. 2 is a sequence diagram illustrating various interactions between selected components of a virtual machine monitor (VMM) to add model specific register (MSR) instrumentation, in accordance with an embodiment of the present disclosure.

FIG. 2 is a sequence diagram illustrating various interactions between selected components of a VMM to add MSR instrumentation, in accordance with an embodiment of the present disclosure. For example, an external application, such as a userland debugger application that may be introspecting a guest VM, such as guest VM 106, may use the kernel API provided by MSR control module 116 to request instrumentation of a particular MSR.

As will be further appreciated in light of this disclosure, for this and other interaction sequences, processes, and methods disclosed herein, the functions performed in the interaction sequences, processes, and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

With reference to FIG. 2, at 202, the application records an MSR-value pair in an instrumentation database. For example, the MSR-value pair can include information that identifies an MSR and specifies a value for the identified MSR. The instrumentation database can be implemented on any suitable data store that is accessible by the application. The application can record the MSR-value pair in the instrumentation database to maintain a record of the MSRs that are being currently instrumented by the application.

At 204, the application sends an MSR instrumentation request command to VMM controller 112 using the provided kernel API. The MSR instrumentation request command specifies an MSR to instrument. For example, in one implementation, the MSR instrumentation request command can include an MSR-value pair as a parameter, and the MSR to instrument can be identified using the MSR-value pair. In some such implementations, a "null" value can be specified in the value component of the MSR-value pair. At 206, VMM controller 112 dispatches the received MSR instrumentation request command to MSR control module 116.

At 208, MSR control module 116 allocates space in and stores the MSR-value pair provided with the MSR instrumentation request command in MSR buffer 118. In an embodiment, MSR buffer 118 can be implemented on any suitable datastore accessible by MSR control module 116 and include information regarding the MSRs that are presently being instrumented. This information may include, for example, identify of the MSRs that are being instrumented, the values of the MSRs being instrumented, and any other suitable information. At 210, MSR control module 116 allocates and stores the MSR-value pair in VMCS 114 in a manner as to configure VMCS 114 to cause a VM exit of guest VM 106 upon access of the identified MSR from userland. Here, VMCS 114 is the VMCS used for managing the operation of guest VM 106. At 212, MSR control module 116 returns a success status to the application that issued the MSR instrumentation request command. Note that this sequence of interactions can be repeated as desired to request instrumentation of additional MSRs.

Figure 3:
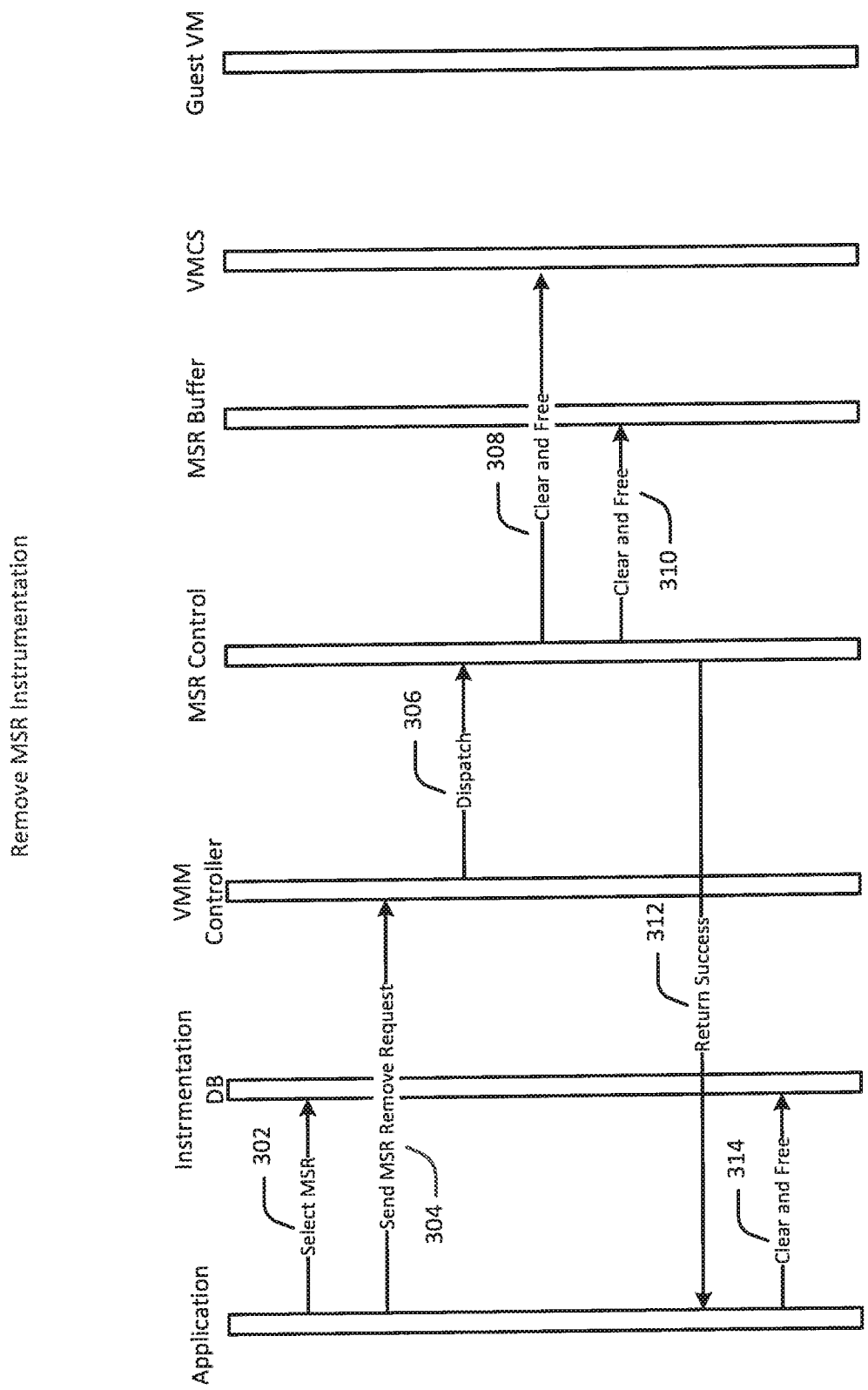
FIG. 3 is a sequence diagram illustrating various interactions between selected components of a virtual machine monitor (VMM) to remove model specific register (MSR) instrumentation, in accordance with an embodiment of the present disclosure.

FIG. 3 is a sequence diagram illustrating various interactions between selected components of a VMM to remove MSR instrumentation, in accordance with an embodiment of the present disclosure. For example, an external application, such as a userland debugger application that may be introspecting a guest VM, such as guest VM 106, may use the kernel API provided by MSR control module 116 to request that instrumentation of a particular MSR that is currently being instrumented be stopped. At 302, the application selects an MSR from the instrumentation database. For example, as previously described, the instrumentation database can be implemented on any suitable data store that is accessible by the application and maintain a record of the MSR that are being currently instrumented by the application.

At 304, the application sends an MSR remove request command to VMM controller 112 using the provided kernel API. The MSR remove request command specifies an MSR to stop instrumenting. For example, in one implementation, the MSR remove request command can include an MSR (i.e., identity of the MSR) as a parameter. At 306, VMM controller 112 dispatches the received MSR remove request command to MSR control module 116.

At 308, MSR control module 116 clears and frees the MSR specified with the MSR remove request command in VMCS 114 in a manner as to configure VMCS 114 to no longer cause (i.e., not cause) a VM exit of guest VM 106 upon access of the identified MSR. Here, VMCS 114 is the VMCS used for managing the operation of guest VM 106. At 310, MSR control module 116 clears and frees the MSR from MSR buffer 118. At 312, MSR control module 116 returns a success status to the application that issued the MSR remove request command. At 314, the application clears and frees the MSR in the instrumentation database such that the MSR is no longer being recorded in the instrumentation database an MSR that is being currently instrumented. Note that this sequence of interactions can be repeated as desired to request that instrumentation of additional MSRs be stopped.

Figure 4:
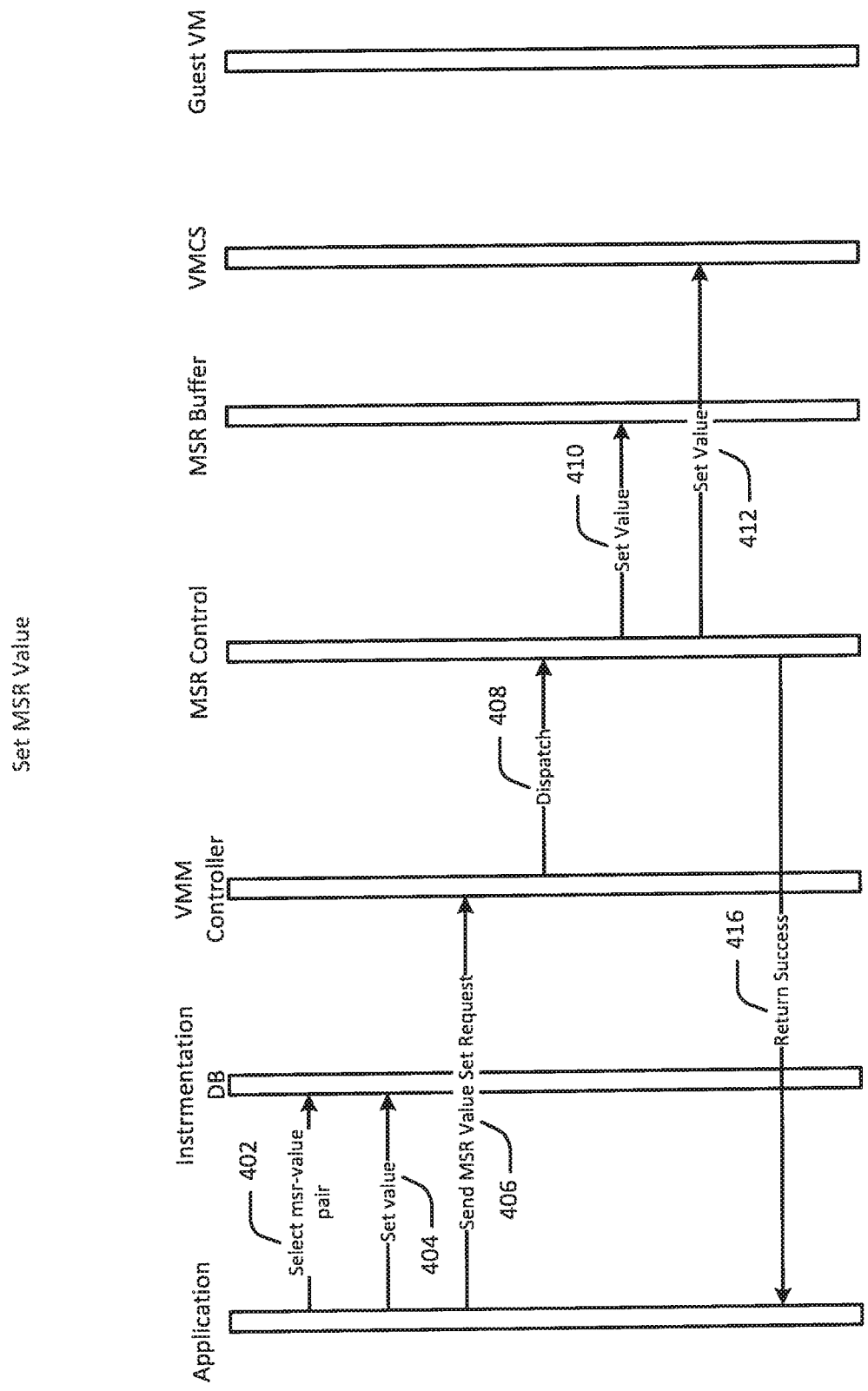
FIG. 4 is a sequence diagram illustrating various interactions between selected components of a virtual machine monitor (VMM) to set a model specific register (MSR) value, in accordance with an embodiment of the present disclosure.

FIG. 4 is a sequence diagram illustrating various interactions between selected components of a VMM to set an MSR value, in accordance with an embodiment of the present disclosure. For example, an external application, such as a userland debugger application that may be introspecting a guest VM, such as guest VM 106, may be instrumenting an MSR. In this example case, the application can use the kernel API provided by MSR control module 116 to set a value for the MSR that is being currently instrumented such that the value is input or read into the MSR upon a VM entry.

At 402, the application selects an MSR-value pair from the instrumentation database. For example, as previously described, the instrumentation database can be implemented on any suitable data store that is accessible by the application and maintain a record of the MSR that are being currently instrumented by the application. The selected MSR-value pair is of the MSR in which the value is to be set. At 404, the application sets a value for the MSR in the instrumentation database. The application can set the value in the instrumentation database to maintain a record of the value that is being set for the MSR.

At 406, the application sends an MSR value set request command to VMM controller 112 using the provided kernel API. The MSR value set request command specifies identifies an MSR and specifies a value for the identified MSR. For example, in one implementation, the MSR value set request command can include an MSR (i.e., identity of the MSR) and a value as parameters. At 408, VMM controller 112 dispatches the received MSR value set request command to MSR control module 116.

At 410, MSR control module 116 sets the value specified in the MSR value set request command in MSR buffer 118. For example, the value may be set or appropriately stored in MSR buffer 118 to maintain a record of the current value (e.g., expected current value subsequent to completion of the MSR value set command) of the identified MSR. At 412, MSR control module 116 sets the value in VMCS 114 in a manner as to configure VMCS 114 to cause the value to be read into the MSR identified in the MSR value set request command upon a VM entry of guest VM 106. Here, VMCS 114 is the VMCS used for managing the operation of guest VM 106. At 414, MSR control module 116 returns a success status to the application that issued the MSR value set request command. Note that this sequence of interactions can be repeated as desired to set values for additional MSRs.

Figure 5:
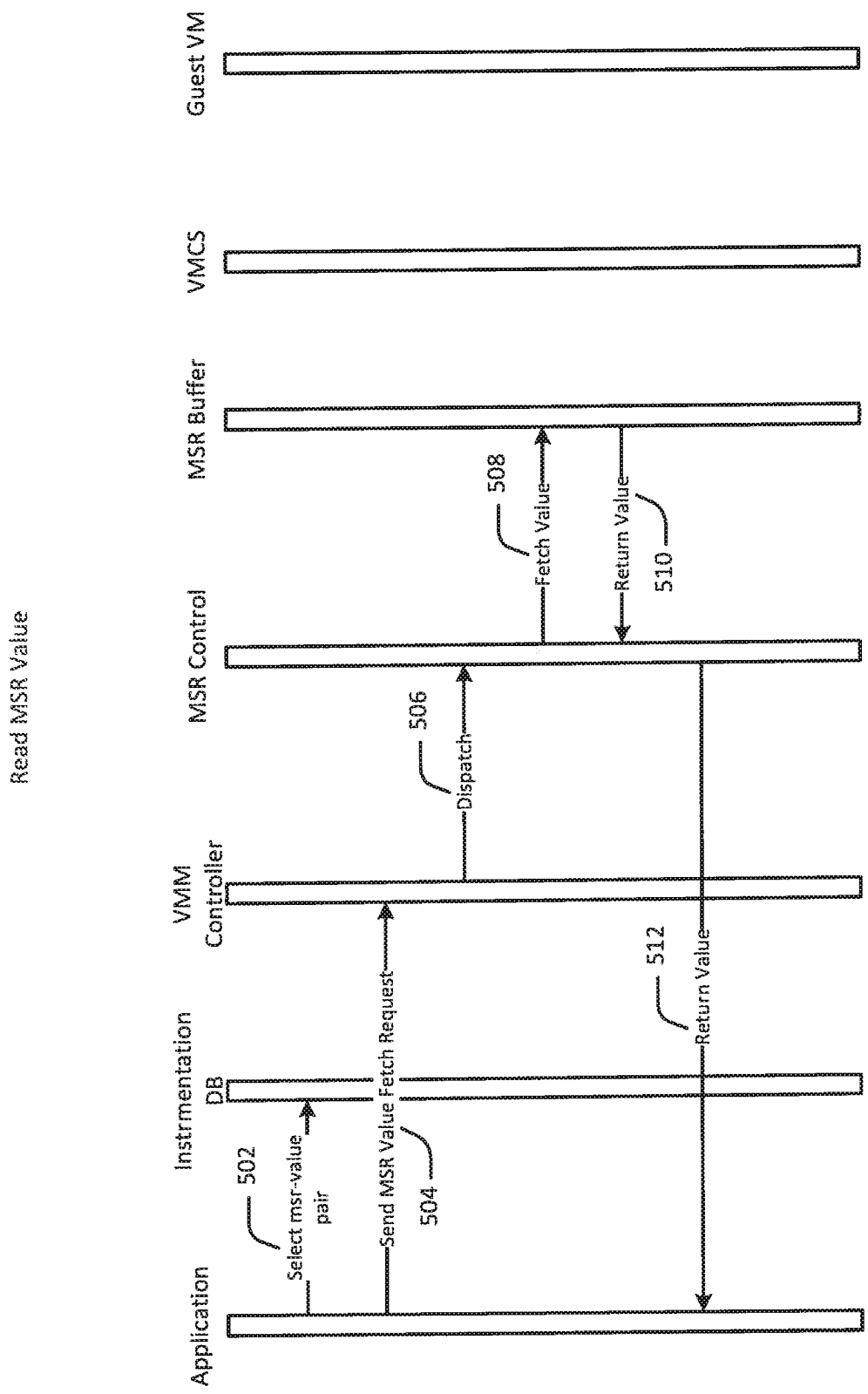
FIG. 5 is a sequence diagram illustrating various interactions between selected components of a virtual machine monitor (VMM) to read a model specific register (MSR) value, in accordance with an embodiment of the present disclosure.

FIG. 5 is a sequence diagram illustrating various interactions between selected components of a VMM to read an MSR value, in accordance with an embodiment of the present disclosure. For example, an external application, such as a userland debugger application that may be introspecting a guest VM, such as guest VM 106, may be instrumenting an MSR. In this example case, the application can use the kernel API provided by MSR control module 116 to request that a current value of the MSR be read upon a VM exit.

At 502, the application selects an MSR-value pair from the instrumentation database. For example, as previously described, the instrumentation database can be implemented on any suitable data store that is accessible by the application and maintain a record of the MSR that are being currently instrumented by the application. The selected MSR-value pair is of the MSR whose value is to be read. At 504, the application sends an MSR value fetch request command to VMM controller 112 using the provided kernel API. The MSR value fetch request command specifies an MSR whose value is to be read. For example, in one implementation, the MSR value fetch request command can include an MSR-value pair as a parameter, and the MSR whose value is to be read can be identified using the MSR-value pair. At 506, VMM controller 112 dispatches the received MSR value fetch request command to MSR control module 116.

At 508, MSR control module 116 fetches (e.g., requests) the value of the MSR identified in the MSR value fetch request command from MSR buffer 118. Note that, unlike VMCS 114 accesses that require privileged processor states, accesses of MSR buffer 118 does not require a privileged processor state and, as a result, may be more efficient. At 510, a value of the MSR is retrieved from (e.g., provided by) MSR buffer 118. At 512, MSR control module 116 returns the fetched value of the MSR to the application that issued the MSR value fetch request command. Note that this sequence of interactions can be repeated as desired to read values of additional MSRs.

Figure 6:
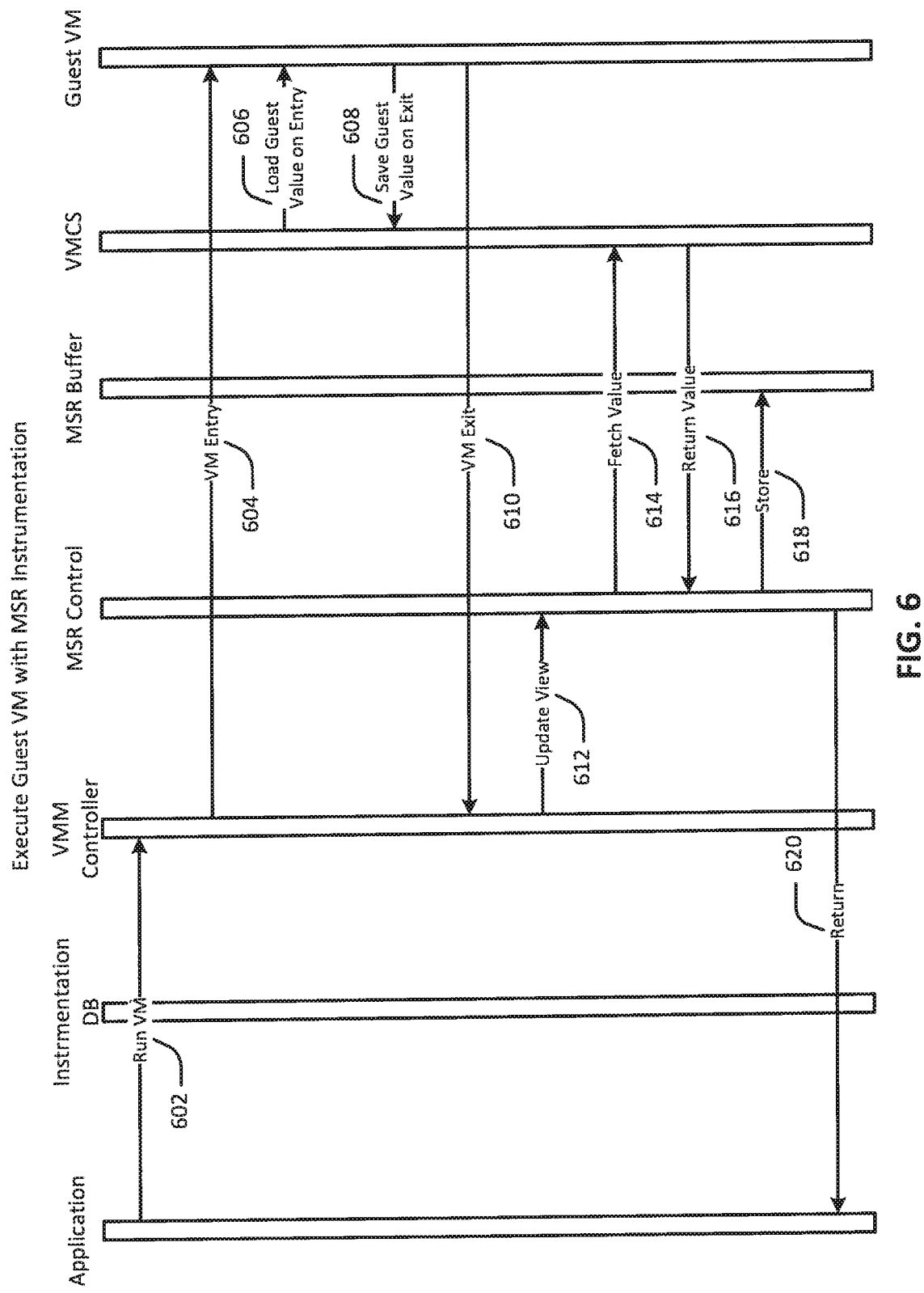
FIG. 6 is a sequence diagram illustrating various interactions between selected components of a virtual machine monitor (VMM) to execute a guest VM with model specific register (MSR) instrumentation, in accordance with an embodiment of the present disclosure.

FIG. 6 is a sequence diagram illustrating various interactions between selected components of a VMM to execute a guest VM with MSR instrumentation, in accordance with an embodiment of the present disclosure. For example, an external application, such as a userland debugger application may be introspecting a guest VM, such as guest VM 106, with MSR instrumentation. At 602, the application sends a run VM command to VMM controller 112. For example, the run VM command can identify the guest VM 106 as the VM that is to be executed. At 604, VMM controller 112 can cause a VM entry into guest VM 106.

At 606, guest VM 106 loads data, such as the guest state data (e.g., the VMCS GSA and control information) from VMCS 114. Upon loading the appropriate data from VMCS 114, guest VM 106 runs until it performs an exception causing of guest VM 106 to exit. For example, to perform the exception, at 608, guest VM 106 saves the guest state information (e.g., the GSA and control information) to VMCS 114 and, at 610, causes a VM exit from guest VM 106 to VMM controller 112.

At 612, VMM controller 112 sends an update view command to MSR control module 116. In an embodiment, the update view command is processed to update the values in MSR buffer 118 with the current values of the MSRs, such as the MSRs that are being instrumented. For example, the values in MSR buffer 118 can be updated using values from VMCS 114. At 614, MSR control module 116 fetches (e.g., requests) the value of the MSR that is being instrumented from VMCS 114. Here, VMCS 114 is the VMCS that is being used to manage the operation of guest VM 106. At 616, a value of the MSR is retrieved from (e.g., provided by) VMCS 114. Note that the application may be instrumenting more than one MSR. In such cases, MSR control module 116 can fetch the respective values of the MSRs that are being instrumented from VMCS 114.

At 618, MSR control module 116 stores the fetched MSR values in MSR buffer 118. At 620, MSR control module 116 returns the fetched value of the MSR (or the values of the MSRs) to the application that issued the run VM command. The application can then further process the returned MSR values (e.g., analyze the MSR values).

Figure 7:
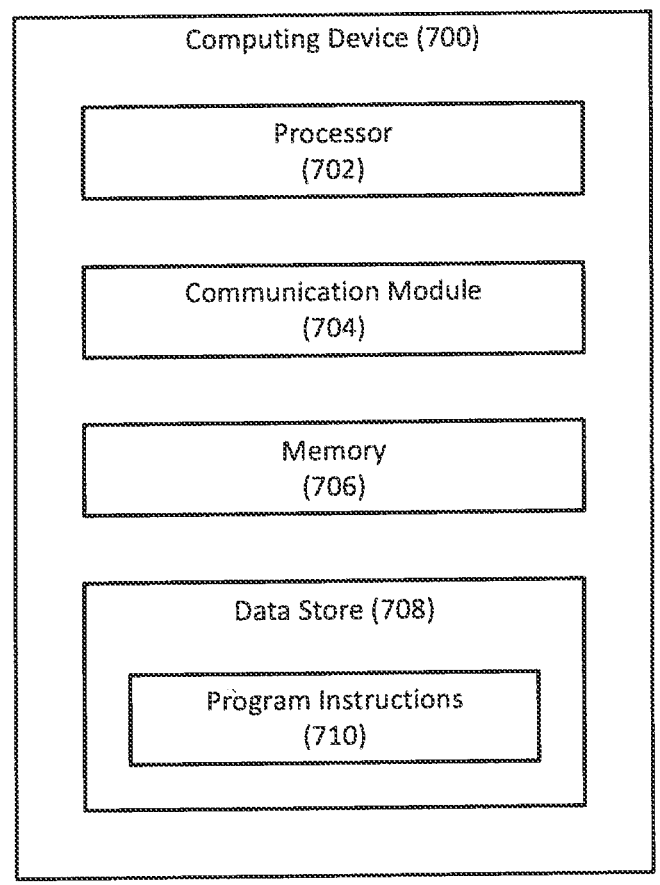
FIG. 7 illustrates selected components of an example computing device that may be used to perform any of the techniques as variously described in the present disclosure, in accordance with an embodiment of the present disclosure.

FIG. 7 illustrates selected components of an example computing device 700 that may be used to perform any of the techniques as variously described in the present disclosure, in accordance with an embodiment of the present disclosure. In some embodiments, computing device 700 may be configured to implement or direct one or more operations associated with some or all of the engines, components and/or modules associated with computing system 100 of FIG. 1. For example, VMM 102, including VMM controller 112, VMCS 114, MSR control module 116, MSR buffer 118, or any combination of these may be implemented in and/or using computing device 700. In one example case, for instance, each of VMM 102, including VMM controller 112, VMCS 114, MSR control module 116, and MSR buffer 118 may be stored on a data store 708, loaded in memory 706, and executable by a processor 702.

In some embodiments, computing device 700 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure. In some embodiments, a distributed computational system may be provided comprising multiple of such computing devices. As shown in FIG. 7, computing device 700 includes processor 702, an interface module 704, memory 706, and data store 708. Processor 702, interface module 704, memory 706, and data store 708 may be communicatively coupled. In various embodiments, additional components (not illustrated, such as a display, communication interface, input/output interface, etc.) or a subset of the illustrated components can be employed without deviating from the scope of the present disclosure.

Processor 702 may be designed to control the operations of the various other components of computing device 700. Processor 702 may include any processing unit suitable for use in computing device 700, such as a single core or multi-core processor. In general, processor 702 may include any suitable special-purpose or general-purpose computer, computing entity, or computing or processing device including various computer hardware, or firmware, and may be configured to execute instructions, such as program instructions, stored on any applicable computer-readable storage media. For example, processor 702 may include a microprocessor, a central processing unit (CPU), a microcontroller, a digital signal processor (DSP), an application-specific integrated circuit (ASIC), a Field-Programmable Gate Array (FPGA), Complex Instruction Set Computer (CISC), Reduced Instruction Set Computer (RISC), multi core, or any other digital or analog circuitry configured to interpret and/or to execute program instructions and/or to process data, whether loaded from memory or implemented directly in hardware. Although illustrated as a single processor in FIG. 7, processor 702 may include any number of processors and/or processor cores configured to, individually or collectively, perform or direct performance of any number of operations described in the present disclosure.

In some embodiments, processor 702 may be configured to interpret and/or execute program instructions and/or process data stored in memory 706, data store 708, or memory 706 and data store 708. In some embodiments, processor 702 may fetch program instructions from data store 708 and load the program instructions in memory 706. After the program instructions are loaded into memory 706, processor 702 may execute the program instructions.

For example, in some embodiments, any one or more of the engines, components and/or modules of computing system 100 may be included in data store 708 as program instructions 710. For example, in such embodiments, program instructions 710 cause computing device 700 to implement functionality in accordance with the various embodiments and/or examples described herein. Processor 702 may fetch some or all of program instructions 710 from data store 708 and may load the fetched program instructions 710 in memory 706. Subsequent to loading the fetched program instructions 710 into memory 708, processor 702 may execute program instructions 710 such that a hypervisor, such as VMM 102, is generated and operates on computing device 700 as variously described herein.

In some embodiments, virtualization may be employed in computing device 700 so that infrastructure and resources in computing device 700 may be shared dynamically. For example, a virtual machine may be provided to handle a process running on multiple processors so that the process appears to be using only one computing resource rather than multiple computing resources. Multiple virtual machines may also be used with one processor.

Communication module 704 can be any appropriate network chip or chipset which allows for wired or wireless communication via a network, such as, by way of example, a local area network (e.g., a home-based or office network), a wide area network (e.g., the Internet), a peer-to-peer network (e.g., a Bluetooth connection), or a combination of such networks, whether public, private, or both. Communication module 704 can also be configured to provide intra-device communications via a bus or an interconnect.

Memory 706 may include computer-readable storage media configured for carrying or having computer-executable instructions or data structures stored thereon. Such computer-readable storage media may include any available media that may be accessed by a general-purpose or special-purpose computer, such as processor 702. By way of example, and not limitation, such computer-readable storage media may include non-transitory computer-readable storage media including Random Access Memory (RAM), Dynamic Random Access Memory (DRAM), Synchronized Dynamic Random Access Memory (SDRAM), Static Random Access Memory (SRAM), non-volatile memory (NVM), or any other suitable storage medium which may be used to carry or store particular program code in the form of computer-executable instructions or data structures and which may be accessed by a general-purpose or special-purpose computer. Combinations of the above may also be included within the scope of computer-readable storage media.

Data store 708 may include any type of computer-readable storage media configured for short-term or long-term storage of data. By way of example, and not limitation, such computer-readable storage media may include a hard drive, solid-state drive, Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), non-volatile memory (NVM), or any other storage medium, including those provided above in conjunction with memory 706, which may be used to carry or store particular program code in the form of computer-readable and computer-executable instructions, software or data structures for implementing the various embodiments as disclosed herein and which may be accessed by a general-purpose or special-purpose computer. Combinations of the above may also be included within the scope of computer-readable storage media. Computer-executable instructions may include, for example, instructions and data configured to cause processor 702 to perform a certain operation or group of operations. Data store 708 may be provided on computing device 700 or provided separately or remotely from computing device 700.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A computer-implemented method to dynamically instrument a model specific register (MSR), the method comprising:
receiving, by a virtual machine monitor (VMM) from a userland application, an MSR instrumentation request command, the MSR instrumentation request command including an MSR-value pair identifying a first MSR to instrument and specifying a value for the first MSR; and
in response to receiving the MSR instrumentation request command, instrumenting, by the VMM, the first MSR by configuring a bitmap of a virtual machine control structure (VMCS) of a guest virtual machine (VM) with the value specified in the MSR-value pair to cause a VM exit of the guest VM upon access of the first MSR, wherein the bitmap controls VM exits for MSRs.

2. The computer-implemented method of claim 1, wherein the MSR instrumentation command is received through a kernel application program interface (API) of the VMM.

3. The computer-implemented method of claim 1, further comprising:
receiving, by the VMM, an MSR remove request command to stop instrumentation of a second MSR; and
in response to receiving the MSR remove request command, configuring, by the VMM, the bitmap of the VMCS to not cause a VM exit of the guest VM upon access of the second MSR.

4. The computer-implemented method of claim 1, further comprising:
receiving, by the VMM, an MSR value set request command that requests that a specified value be input into a third MSR; and
in response to receiving the MSR value set request command, configuring, by the VMM, the VMCS to cause the specified value to be input into the third MSR.

5. The computer-implemented method of claim 4, wherein the specified value is input into the third MSR upon a VM entry of the guest VM.

6. The computer-implemented method of claim 1, further comprising:
receiving, by the VMM, an MSR value fetch request command that requests that a current value of a fourth MSR to be read and returned; and
in response to receiving the MSR value fetch request command, configuring, by the VMM, the VMCS to cause the current value of the fourth MSR to be read.

7. The computer-implemented method of claim 6, wherein the current value of the fourth MSR is read upon a VM exit of the guest VM.

8. A system to dynamically instrument a model specific register (MSR), the system comprising:
one or more non-transitory machine-readable mediums configured to store instructions;
and one or more processors configured to execute the instructions stored on the one or more non-transitory machine-readable mediums, wherein execution of the instructions causes the one or more processors to generate a virtual machine monitor (VMM) that is configured to:
receive an MSR instrumentation request command from a userland application, the MSR instrumentation request command including an MSR-value pair identifying a first MSR to instrument and specifying a value for the first MSR; and
responsive to receipt of the MSR instrumentation request command, instrument the first MSR by configuring a bitmap of a virtual machine control structure (VMCS) of a guest virtual machine (VM) with the value specified in the MSR-value pair to cause a VM exit of the guest VM upon access of the first MSR, wherein the bitmap controls VM exits for MSRs.

9. The system of claim 8, wherein the VMM is a Type-1 hypervisor.

10. The system of claim 8, wherein the VMM is further configured to provide a kernel application program interface (API), and wherein the MSR instrumentation request command is received through the kernel API.

11. The system of claim 8, wherein execution of the instructions further causes the one or more processors to:
  receive an MSR remove request command to stop instrumentation of a second MSR; and
  responsive to receipt of the MSR remove request command, configure the bitmap of the VMCS to not cause a VM exit of the guest VM upon access of the-second MSR.

12. The system of claim 8, wherein execution of the instructions further causes the one or more processors to:
  receive an MSR value set request command that requests that a specified value be input into a third MSR; and
  responsive to receipt of the MSR value set request command, configure the VMCS to cause the specified value to be input into the third MSR.

13. The system of claim 12, wherein the specified value is input into the third MSR upon a VM entry of the guest VM.

14. The system of claim 8, wherein execution of the instructions further causes the one or more processors to:
  receive an MSR value fetch request command that requests that a current value of a fourth MSR to be read and returned; and
  responsive to receipt of the MSR value fetch request command, configure the VMCS to cause the current value of the fourth MSR to be read.

15. The system of claim 14, wherein the current value of the fourth MSR is read upon a VM exit of the guest VM.

16. The system of claim 8, wherein the MSR instrumentation request command is issued by an application external to the VMM.

17. A computer program product including one or more non-transitory machine-readable mediums encoding instructions that when executed by one or more processors cause a process to be carried out to dynamically instrument a model specific register (MSR), the process comprising, by a virtual machine monitor (VMM):
  receiving an MSR instrumentation request command from a userland application, the MSR instrumentation request command including an MSR-value pair identifying an MSR to instrument and specifying a value for the first MSR; and
  in response to receiving the MSR instrumentation request command, instrumenting the MSR identified in the MSR instrumentation request command by configuring a bitmap of a virtual machine control structure (VMCS) of a guest virtual machine (VM) with the value specified in the MSR-value pair to cause a VM exit of the guest VM upon access of the identified MSR, wherein the bitmap controls VM exits for MSRs.

18. The computer program product of claim 17, wherein the process further comprises: receiving an MSR remove request command to stop instrumentation of the identified MSR; and
  in response to receiving the MSR remove request command, configuring the bitmap of the VMCS to not cause a VM exit of the guest VM upon access of the identified MSR.

* * * * *